US012784115B2

(12) United States Patent
Lee et al.

(10) Patent No.: US 12,784,115 B2
(45) Date of Patent: Nov. 3, 2026

(54) METHOD AND SYSTEM FOR BALANCING ENERGY DEMAND-SUPPLY AT COMMUNITY LEVEL BASED ON SELF-DEMAND RESPONSE

(71) Applicant: EIPGRID INC., Seoul (KR)

(72) Inventors: Whee Sung Lee, Gyeonggi-do (KR); Jeom Bae Park, Seoul (KR)

(73) Assignee: EIPGRID INC., Seoul (KR)

( * ) Notice: Subject to any disclaimer, the term of this patent is extended or adjusted under 35 U.S.C. 154(b) by 332 days.

(21) Appl. No.: 18/444,699

(22) Filed: Feb. 18, 2024

(65) Prior Publication Data

US 2025/0259250 A1 Aug. 14, 2025

(30) Foreign Application Priority Data

Feb. 13, 2024 (KR) ........................ 10-2024-0020287

(51) Int. Cl.
*G06Q 30/02* (2023.01)
*G06Q 30/0202* (2023.01)
*G06Q 50/06* (2012.01)

(52) U.S. Cl.
CPC ......... *G06Q 50/06* (2013.01); *G06Q 30/0202* (2013.01)

(58) Field of Classification Search
CPC .......... G07G 1/12; G06N 3/092; G06N 20/00; G06Q 50/06; G06Q 30/0201; G06Q 30/0206; G06Q 30/0202; G06Q 40/04
See application file for complete search history.

(56) References Cited

U.S. PATENT DOCUMENTS 7,003,487 B1 * 2/2006 Skirpa ................ G06Q 30/0206 705/37
2015/0206078 A1 * 7/2015 Giroti .................... G06Q 50/16 705/7.12

(Continued)

FOREIGN PATENT DOCUMENTS

| | | |
|---|---|---|
| KR | 1020220150778 A | 11/2022 |
| KR | 102485614 | 1/2023 |
| KR | 1020230039311 A | 3/2023 |

OTHER PUBLICATIONS

Fazeli et al., Coordinated optimal dispatch of distributed energy resources within a smart energy community cell, 2012, IEEE, p. 1-10 (Year: 2012).*

(Continued)

*Primary Examiner* — Mcdieunel Marc
(74) *Attorney, Agent, or Firm* — AVEK IP, LLC

(57) ABSTRACT

A method of balancing energy demand-supply at a community level based on self-demand response obtains balance of energy demand-supply at a community level. The method achieves and manages the balance of energy demand-supply within the community itself by creating a balancing group in units of time zones and using a reserve margin of the balancing group. The method may include: (a) dividing a predetermined region into a plurality of communities, by a community configuration module; (b) defining a plurality of windows, each window being a time period set to a predetermined time period, by a window definition module; (c) creating a balancing group including demand response resources and distributed energy resources included in one community for each window, by a balancing module; and (d) reducing or eliminating a demand-supply difference of power in the community using the balancing group created in each window, by the balancing module.

8 Claims, 4 Drawing Sheets

(56) References Cited

U.S. PATENT DOCUMENTS

| | | | | |
|---|---|---|---|---|
| 2016/0190826 A1* | 6/2016 | Yeung | H02J 3/00 | |
| | | | 307/20 | |
| 2023/0281720 A1* | 9/2023 | Shao | G06Q 30/0206 | |
| 2025/0130549 A1* | 4/2025 | Janis | G06Q 50/06 | |

OTHER PUBLICATIONS

Reis et al., Residential demand-side flexibility in energy communities: a combination of optimization and agent modeling approaches, 2019, IEEE, p. 1-6 (Year: 2019).*
Mar et al., Resilience Metrics applied to Renewable Energy Communities, 2023, IEEE, p. 1-5 (Year: 2023).*
Doroudchi et al., Increasing Self-Sufficiency of Energy Community by Common Thermal Energy Storage, 2022, IEEE, p. (Year: 2022).*

* cited by examiner

METHOD AND SYSTEM FOR BALANCING ENERGY DEMAND-SUPPLY AT COMMUNITY LEVEL BASED ON SELF-DEMAND RESPONSE

BACKGROUND OF THE INVENTION

Field of the Invention

The present invention relates to a method and system for balancing energy demand-supply at a community level based on self-demand response (Self-DR), and more specifically, to a method and system for balancing energy demand-supply at a community level based on self-demand response, which obtains balance of energy demand-supply at a community level, and achieves and manages the balance of energy demand-supply within the community itself, by creating a balancing group for obtaining the balance of energy demand-supply in units of time zones and using the reserve margin of the balancing group.

Background of the Related Art

As new and renewable energy generation increases recently, predicting supply and demand of electric power is more uncertain for electricity market operators, and this phenomenon occurs due to various reasons.

First, irregular natural conditions or disasters increase uncertainty. The new and renewable energy generation depends on natural conditions. For example, wind power generation fluctuates according to the strength and direction of wind, and solar power generation fluctuates according to the weather and the amount of sunlight, and these natural conditions are not easy to predict.

Next, distributed power generation increases uncertainty. The new and renewable energy generation is distributed unlike traditional power plants, and as many small-scale power plants are installed across several regions, it is difficult to predict a total amount of power generation.

Next, there are limitations in technology. Current prediction techniques are insufficient to fully compensate for irregularities of the new and renewable energy. It is since that, for example, weather forecasts may be inaccurate, and it may be difficult to accurately predict the effect of clouds in the case of solar power generation.

Next, there is a problem in the lack of storage technology. Due to the lack of energy storage technology, the capacity of storing generated energy is limited. This invites difficulties in controlling supply and demand of the new and renewable energy.

Uncertainty generated from these problems is a problem to be solved strategically by power market operators, and to this end, development of more accurate prediction techniques is required. Particularly, it is very difficult to achieve an accurate supply-demand balance of power in an environment where power cannot be supplied by the power market operators.

SUMMARY OF THE INVENTION

Therefore, the present invention has been made in view of the above problems, and it is an object of the present invention to provide a method and system for balancing energy demand-supply at a community level based on self-demand response, which obtains balance of energy demand-supply at a community level, and achieves and manages the balance of energy demand-supply within the community itself, by creating a balancing group for obtaining the balance of energy demand-supply in units of time zones and using the reserve margin of the balancing group.

The technical problems to be achieved by the method and system for balancing energy demand-supply at a community level based on self-demand response according to the technical spirit of the present invention are not limited to the problems mentioned above, and unmentioned other problems will be clearly understood by those skilled in the art from the following description.

A method of balancing energy demand-supply at a community level based on self-demand response according to an embodiment by the technical spirit of the present invention comprises the steps of: (a) dividing a predetermined region into a plurality of communities, by a community configuration module; (b) defining a window, which is a time period set to a predetermined time period, by a window definition module; (c) creating a balancing group including demand response resources and distributed energy resources included in one community for each of the windows, by a balancing module; and (d) reducing or eliminating a demand-supply difference of power in the community using the balancing group created in each window of the community, by the balancing module.

Step (c) may include the steps of: analyzing individual resource patterns including power consumption patterns of the demand response resources included in the community and power production patterns of the distributed energy resources included in the community; and creating the balancing group by selecting demand response resources and distributed energy resources that can reduce or eliminate the demand-supply difference of power in the community within the window on the basis of the individual resource patterns.

Step (d) may include the step of reducing or eliminating the demand-supply difference of power in the community by using a reserve margin calculated considering power used by the demand response resources and power produced or charged and discharged by the distributed energy resources.

When demand of power for the community exceeds supply of power within the window, the balancing module may create the balancing group by selecting the demand response resources and the distributed energy resources in the community to generate a reserve margin corresponding to the exceeded demand of power.

When supply of power for the community exceeds demand of power within the window, the balancing module may create the balancing group by selecting the demand response resources and the distributed energy resources in the community to charge the exceeded supply of power.

The balancing module may supply the reserve margin of the balancing group, which remains after being used for the community within the window, to the outside of the community.

Step (d) may include the steps of providing the balancing module with past data on the demand-supply difference of power in the community in units of windows by using individual resource patterns of the past, by the pattern analysis module, wherein the balancing module creates the balancing group by selecting demand response resources and distributed energy resources that can reduce or eliminate the demand-supply difference of power in the past derived from a window of the same time in the past.

At step (d), the balancing module may calculate a first demand-supply difference of power in the community generated in a first window, and the balancing module may create the balancing group by selecting demand response resources and distributed energy resources that can reduce or eliminate the first demand-supply difference of power in the community in a second window successively located after the first window.

BRIEF DESCRIPTION OF THE DRAWINGS

In order to more fully understand the drawings cited in this specification, a brief description of each drawing is provided.

DETAILED DESCRIPTION OF THE PREFERRED EMBODIMENT

Figure 1:
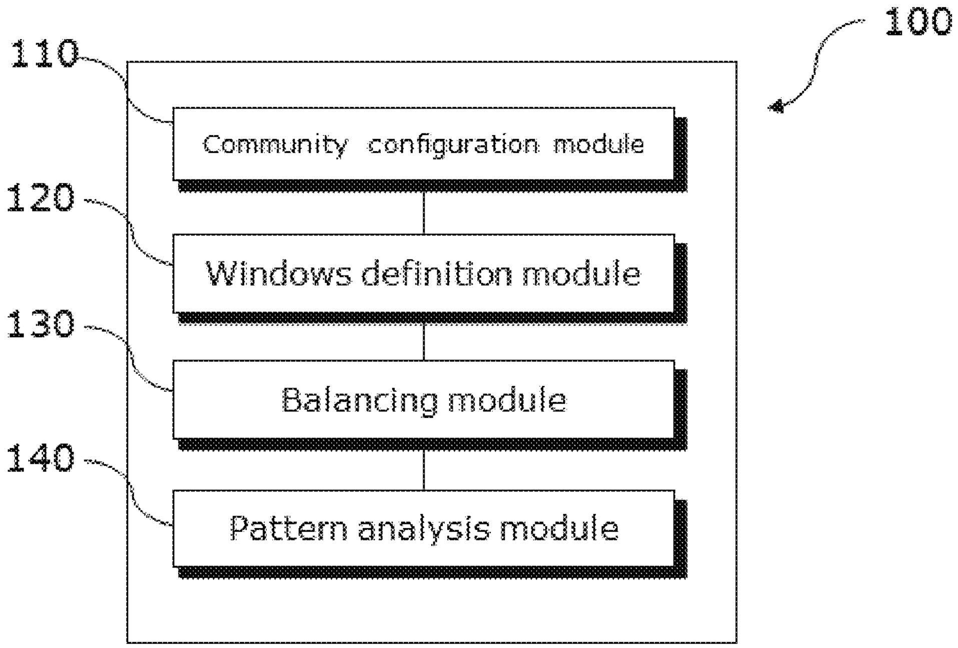
FIG. 1 is a schematic view showing a system for balancing energy demand-supply at a community level based on self-demand response according to an embodiment of the present invention.

Since the present invention may make various changes and have various embodiments, specific embodiments will be illustrated in the drawings and described in detail through the detailed description. However, this is not intended to limit the present invention to specific forms, and it should be understood that the present invention includes all changes, equivalents, and substitutes included in the spirit and technical scope of the present invention.

When it is determined, in describing the present invention, that detailed description of related known techniques may unnecessarily obscure the gist of the present invention, the detailed description will be omitted. In addition, numbers (e.g., first, second, etc.) used in the description of this specification are merely identifiers for distinguishing one component from the others.

In addition, when a component is referred to as being "connected" or "coupled" to another component in this specification, the component may be directly connected or coupled to another component, and unless specifically stated otherwise in the context, it should be understood that it may be connected or coupled with the intervention of another component in the middle.

In addition, a component expressed as a 'module' in this specification may be two or more components combined into one component, or may be one component divided into two or more components according to more detailed functions. In addition, each of the components described below may additionally perform some or all of the functions of other components, in addition to the main functions performed by each component, and some of the main functions of each component may be exclusively performed by another component.

Hereinafter, embodiments based on the technical spirit of the present invention will be described in detail.

Figure 2:
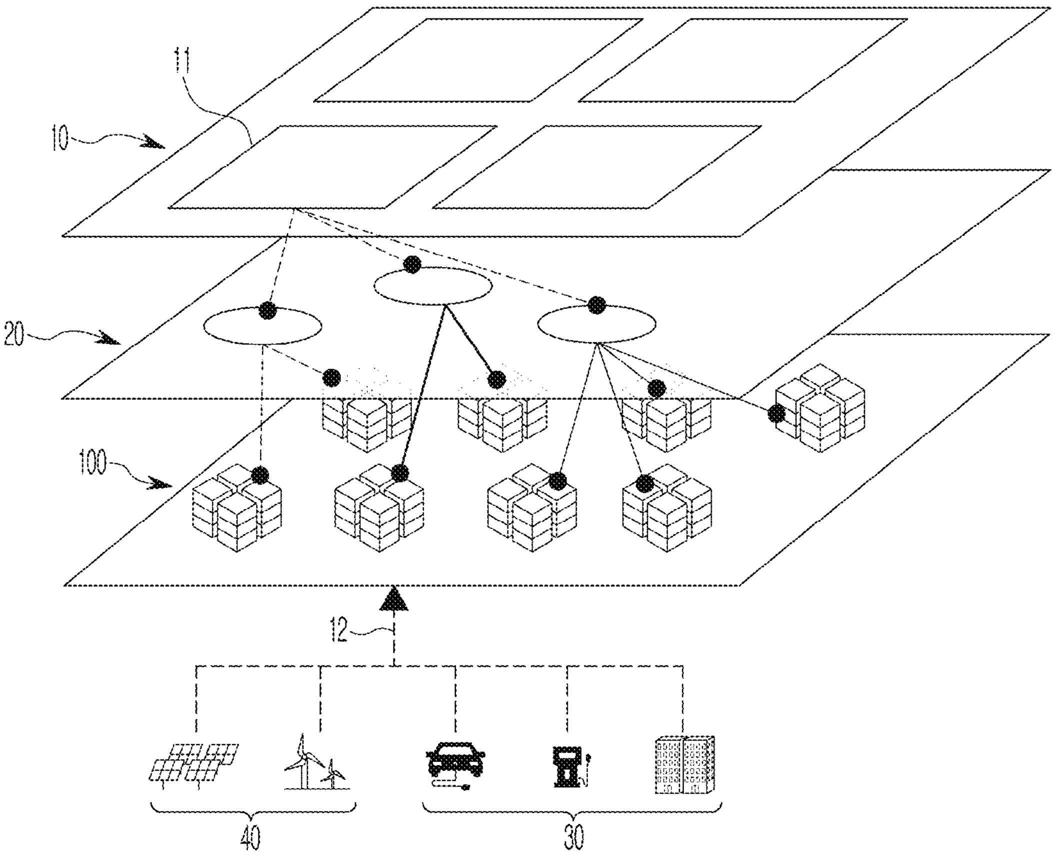
FIG. 2 is a view schematically showing a power supply structure including a system for balancing energy demand-supply at a community level based on self-demand response according to an embodiment of the present invention.
Figure 3:
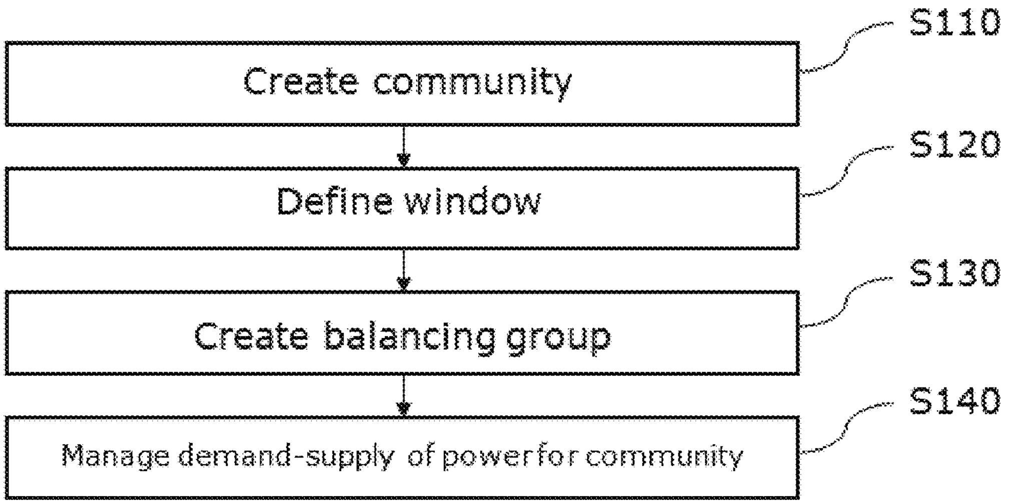
FIG. 3 is a flowchart illustrating a method of balancing energy demand-supply at a community level based on self-demand response according to an embodiment of the present invention.

FIG. 1 is a schematic view showing a system for balancing energy demand-supply at a community level based on self-demand response according to an embodiment of the present invention. FIG. 2 is a view schematically showing a power supply structure including a system for balancing energy demand-supply at a community level based on self-demand response according to an embodiment of the present invention. FIG. 3 is a flowchart illustrating a method of balancing energy demand-supply at a community level based on self-demand response according to an embodiment of the present invention.

A system 100 for balancing energy demand-supply at a community level based on self-demand response according to an embodiment of the present invention may include a community configuration module 110, a window definition module 120, a balancing module 130, and a pattern analysis module 140. Hereinafter, an energy demand-supply balancing method performed by the energy demand-supply balancing system 100 will be described in detail.

The community configuration module 110 may be configured of a plurality of communities 20 having a predetermined region of a predetermined area, i.e., a plurality of self-demand response communities 20 (S110). The size or location of the communities 20 may be determined according to various criteria. For example, a community 20 may be defined as a combination of regions divided according to a power supply grid network 10.

As shown in FIG. 2, power supplied through the grid network 10 by a distribution system operator (DSO) and a transmission system operator (TSO) may be supplied to the communities 20.

DSO refers to a company or an organization that supplies power to consumers by itself, which generally manages low-voltage grids and supplies power to homes, commercial facilities, industrial facilities, or the like. TSO refers to a company or an organization that transmits power at a high voltage, and transmits electricity generated by power plants to various regions through transmission networks. The energy demand-supply balancing system 100 manages demand-supply of power at a community 20 level to produce and use power within the community 20 without the DSO and TSO.

Figure 4:
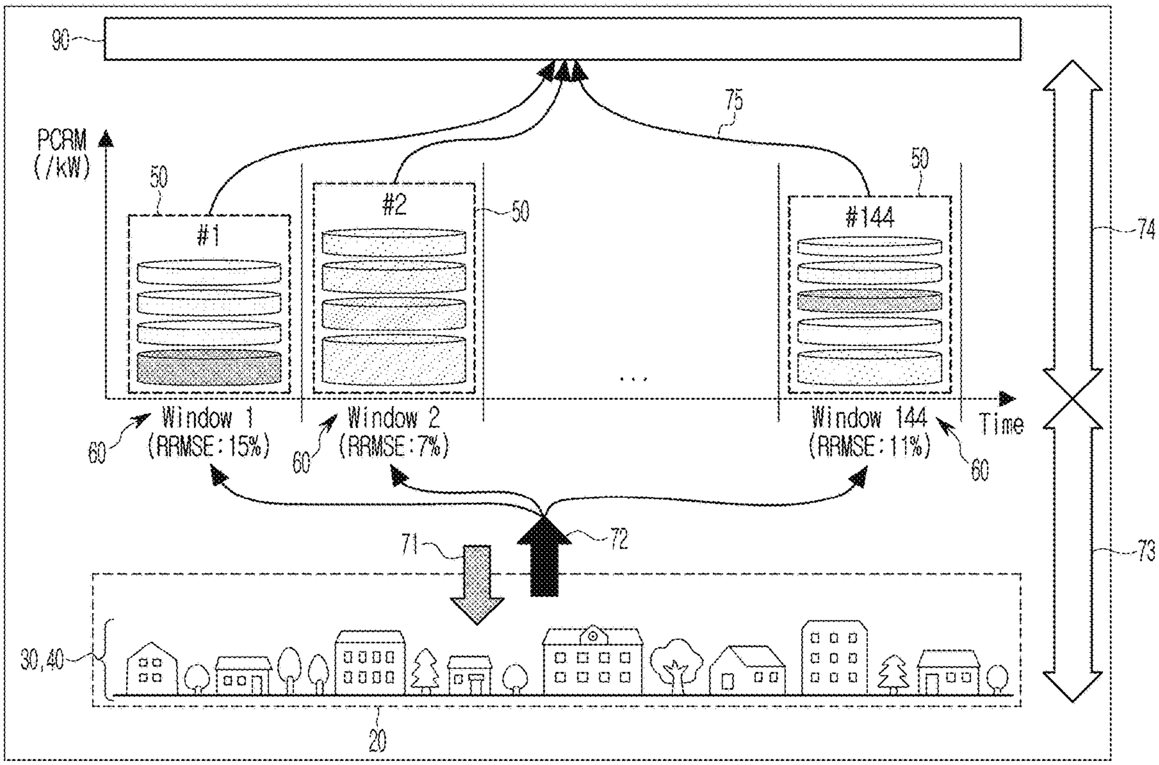
FIG. 4 is a view schematically showing windows and balancing groups used in a method of balancing energy demand-supply at a community level based on self-demand response according to an embodiment of the present invention.
Figure 5:
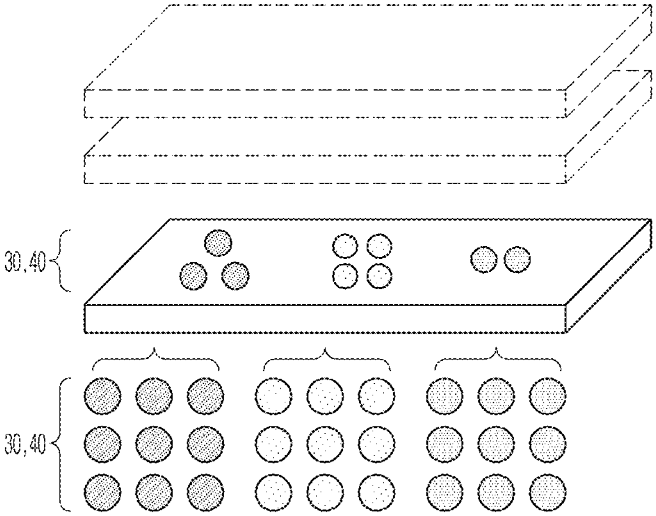
FIGS. 5 to 7 are views schematically showing a method of forming a balancing group in a method of balancing energy demand-supply at a community level based on self-demand response according to an embodiment of the present invention.
Figure 6:
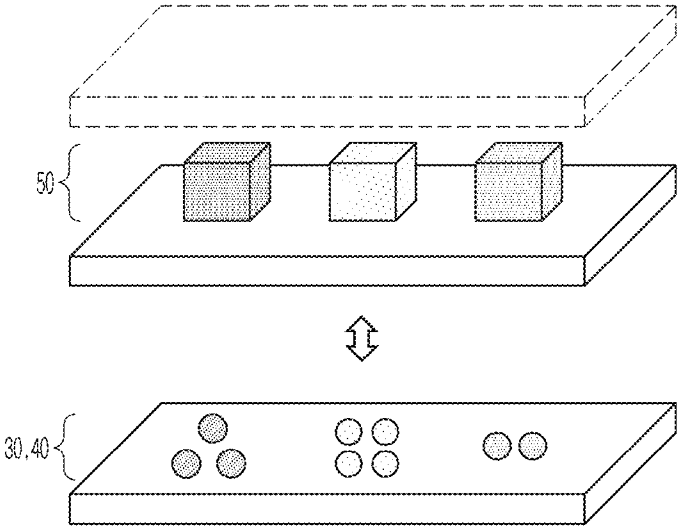
Figure 7:
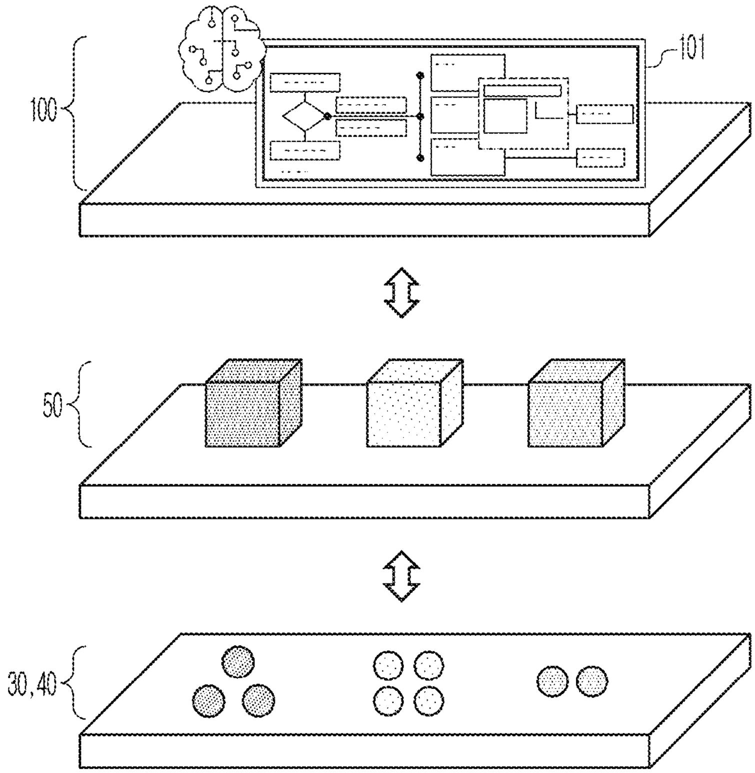

FIG. 4 is a view schematically showing windows and balancing groups used in a method of balancing energy demand-supply at a community level based on self-demand response according to an embodiment of the present invention. FIGS. 5 to 7 are views schematically showing a method of forming a balancing group in a method of balancing energy demand-supply at a community level based on self-demand response according to an embodiment of the present invention.

The window definition module 120 may define a "window" 60, which is a time period that can be set to a predetermined time period (S120). 24 hours a day may be divided into a plurality of windows 60, and for example, when the window 60 is defined as 10 minutes, 24 hours a day may have 144 windows 60.

The balancing module 130 may create, for each window 60, a balancing group 50 including demand response resources 30 and distributed energy resources 40 included in one community 20 (S130), and reduce or eliminate demand-supply difference of power in the community 20 using the balancing group 50 created in each window 60 of the community 20 (S140).

Here, the demand response resources (DR resources) 30 are used to maintain stability of power grids by managing and regulating demand of power, and are generally generated as power consumers control or regulate demand of power. The balance of a power grid can be maintained by reducing demand of power through demand response when supply of power is insufficient, and increasing demand of power when supply of power is excessive. For example, when supply of power is insufficient, power providers may request some consumers to reduce consumption of power or to delay use of power. Examples of the demand response resources include smart meters, smart home systems, and the like.

The distributed energy resources (DER) mean a regionally distributed power generation and storage system rather than a traditional centralized power plant, and representative distributed energy resources may include solar power generation, wind power generation, small hydro power generation, biomass power generation, Energy Storage System (ESS), and the like. These distributed energy resources may generate power regionally, be connected to a power grid network, and supply power.

Although it is general that electric vehicles and electric vehicle charging stations are not considered as distributed energy resources since they are energy consumers and receive power mainly from power grids, when the energy charged in the battery of an electric vehicle is connected to the power grid network and used to supply power or when the electric vehicle charging station autonomously produces electricity through solar panels or the like, the electric vehicles and the electric vehicle charging stations may also be classified as distributed energy resources.

At the step of creating the balancing group 50 by the balancing module 130 (S130), the balancing module 130 may analyze individual resource patterns and create a balancing group 50 on the basis of analyzed individual resource patterns.

The balancing module 130 may analyze individual resource patterns including power consumption patterns of the demand response resources 30 included in the community 20 and power production patterns of the distributed energy resources 40 included in the community 20. Since the power consumption patterns of the demand response resources 30 and the power production patterns of the distributed energy resources 40 over time can be obtained through the analysis, demand response resources 30 and distributed energy resources 40 for configuring the balancing group 50 in each window may be selected on the basis of the patterns.

On the basis of the analyzed individual resource patterns, the balancing module 130 may select demand response resources 30 and distributed energy resources 40 that can reduce or eliminate the demand-supply difference of power in the community 20 within one window 60, and include the resources in the balancing group (BG) 50.

The balancing module 130 may reduce or eliminate the demand-supply difference of power in the community 20 by using a reserve margin calculated from the balancing group 50 set for one window 60.

The reserve margin refers to an extra power capacity maintained to guarantee stable operation of the power grid when an unexpected situation or an abrupt change occur in the demand of power, and the reserve margin of the balancing group 50 may be determined by the power charged and discharged by the distributed energy resources 40, the power produced by the distributed energy resources 40, and the power used by the demand response resources 30, included in the balancing group 50. For example, the reserve margin of the balancing group 50 may be determined by the power that the demand response resources 30 can reduce, the power produced by the distributed energy resources 40 such as solar power plants, the power discharged by the distributed energy resources 40 such as ESS, and the like.

The balancing module 130 may create a first balancing group of a first window using the demand response resources 30 and the distributed energy resources 40 that can reduce or eliminate the demand-supply difference of power generated in the first window, and may create a second balancing group of a second window, which is a next time zone, using the demand response resources 30 and the distributed energy resources 40 that can reduce or eliminate the demand-supply difference of power generated in the second window. The balancing module 130 may reduce or eliminate the demand-supply difference of power by forming an appropriate balancing group 50 for each window 60 in this way.

When demand of power for a community 20 exceeds supply of power within one window 60, the balancing module 130 may create the balancing group 50 by combining the distributed energy resources 40 that can produce power and the demand response resources 30 that can reduce use of power within the community 20, in order to generate a reserve margin corresponding to the exceeded demand of power.

In addition, when supply of power for the community 20 exceeds demand of power within the window 60, the balancing module 130 may create a balancing group 50 by combining the distributed energy resources 40 that can charge power and the demand response resources 30 that can increase use of power within the community 20, in order to charge the exceeded supply of power.

The balancing module 130 may supply the reserve margin of the balancing group 50, which remains after reducing or eliminating the demand-supply difference of power in the community 20 within one window 60, to the outside of the community 20.

As shown in FIG. 4, the reserve margin of the balancing groups secured for each window 60 may be used for energy efficiency and optimization of the community itself, and may also be used as a resource that can participate in the energy market (balancing market), and profits can be generated through the reserve margin.

In addition, the reserve margin of the balancing groups secured for each window 60 may be used for energy efficiency and optimization of the community itself, and may also be directly provided to other communities. Accordingly, even when there is no power market operator, demand-supply control of power can be resolved within the community itself, and power trading can be made between communities.

The procurement capability of reserve margin (PCRM) technique of the energy demand-supply balancing system 100 may include a pattern-analyzing method shown in FIG. 5, a group pattern-supervising method shown in FIG. 6, and a load-balancing method shown in FIG. 7.

For the pattern analysis method, collection of data, such as the types of business, contract capacity, types of retail contract, building facility information, load of each balancing group 50, root relative mean square error (PRMSE) and customer baseline load (CBL) of each balancing group 50, power consumption, and power generation sources including DER 40, and the like, from the aspect of energy consumers, should be considered.

Through the pattern-supervising methods, a balancing group 50 may be formed for each window 60, and simulation for each balancing group 50, performance prediction for each balancing group 50, and operation scheduling of each balancing group 50 can be made. When a balancing group is formed for each 10-minute window 60, information such as estimated reduced energy consumption (kWh), estimated CO: reduction, estimated resource generation performance, estimated BG operation performance, estimated self-DR performance, and the like can be derived through simulations and predictions.

The load-balancing method operates self-demand response (Self-DR) schemes and observes and manages the load of each balancing group to obtain best performance of energy saving.

In order for the balancing module 130 to reduce or eliminate the demand-supply difference of power in the community 20 in units of windows 60, the pattern analysis module 140 may provide the balancing module 130 with past data on the demand-supply difference of power in the community 20 in units of windows 60 using individual resource patterns generated in the past. For example, the pattern analysis module 140 may provide the balancing module 130 with data on the demand-supply difference of power generated during a day one day ago in units of windows, or may provide the balancing module 130 with data on the demand-supply difference of power predicted by an AI that has performed machine learning based on individual resource patterns accumulated in the past.

The balancing module 130 may create a balancing group 50 including the demand response resources 30 and the distributed energy resources 40 that can reduce or eliminate the demand-supply difference of the power in the past derive d in the window 60 of the same time in the past. For example, the balancing module 130 may create a balancing group 50 for reducing or eliminating the demand-supply difference of power measured in the window between 15:00 and 15:10 today and in the window between 15:00 and 15:10 yesterday.

In creating the balancing group 50 of the community 20, the balancing module 130 may machine-learn the operation data of other communities of similar types or similar load patterns, and create the balancing group 50 with reference to a result thereof. Here, the "other communities" may be a community within the energy demand-supply balancing system 100 or a community of another system outside the energy demand-supply balancing system 100.

The balancing module 130 may create the balancing group 50 in the next window in a direction of reducing or eliminating the demand-supply difference of power generated in the immediately previous window, rather than data of a past date. The balancing module 130 may calculate a first demand-supply difference of power in the community 20 generated in a first window, and create a balancing group 50 including demand response resources 30 and distributed energy resources 40 that can reduce or eliminate the first demand-supply difference of power in the community in a second window successively located after the first window.

Demand response (DR) programs of the prior art are structures managed and operated by power market operators (e.g., Korea Power Exchange (KPX)). However, the self-demand response (self-DR) technique of the method and system for balancing energy demand-supply at a community level based on self-demand response according to an embodiment by the technical spirit of the present invention allows a community 20 to create, manage, and operate a demand response program of its own on the basis of artificial intelligence (AI) and machine learning technology although a demand response market does not exist in a specific country.

There are various types of Demand Response Operation Schemes such as Peak Clipping, Flexible Load Shape, Load Shifting, and Strategic Load Shifting, and the energy demand-supply balancing method and system according to an embodiment by the technical spirit of the present invention may provide a method of performing advance predictions, simulations, and scheduling, for selecting an optimal demand response operation scheme targeting the balancing groups 50 secured through PCRM. Through this, an optimal supply-demand balancing service may be provided in units of communities 20, and additional distributed resource linking strategies for continuously securing community energy efficiency and continuous services for increasing the energy self-sufficiency of the community can be provided.

The functional operations described above in this specification and the embodiments of the subject matter may be implemented in digital electronic circuits, computer software, firmware or hardware, including the structures disclosed in this specification and their structural equivalents, or in a combination of one or more of these.

The embodiments of the subject matters described in this specification may implemented as one or more computer program products, in other words, one or more modules related to computer program instructions encoded on a tangible program medium for execution by a data processing device or to control the operation thereof. The tangible program medium may be a waveform signal or a computer-readable medium. The waveform signal is an artificially generated signal, such as an electrical, optical, or electro-magnetic signal generated by a machine, which is generated to encode information to be transmitted to an appropriate receiver device for execution by a computer. The computer-readable medium may be a machine-readable storage device, a machine-readable storage substrate, a memory device, a combination of materials that affect a machine-readable waveform signal, or a combination of one or more of these.

A computer program (also known as a program, software, software application, script, or code) may be written in any form of a programming language including compiled or interpreted languages or priori or procedural languages, and may be deployed in any form including stand-alone programs or modules, components, subroutines, or other units suitable for being used in a computer environment.

The computer program does not necessarily correspond to a file of a file system. The program may be stored in a single file provided to a requested program, in multiple interacting files (e.g., files storing one or more modules, subprograms, or part of a code), or in part of a file including other programs or data (e.g., one or more scripts stored in a markup language document).

The computer program may be deployed to be located at one site or distributed across a plurality of sites and executed on multiple computers connected to each other through a communications network or on executed one computer.

In addition, the logical flow and structural block diagrams described in this specification describe corresponding functions supported by the disclosed structural means, corresponding behaviors supported by the steps, and/or specific methods, and may also be used to construct corresponding software structures, algorithms, and equivalents thereof.

The processes and logic flows described in this specification can be performed by one or more programmable processors that execute one or more computer programs to perform functions by operating on input data and generating outputs.

Processors suitable for executing computer programs include, for example, both general-purpose and special-purpose microprocessors and any one or more processors of any type of digital computers. Generally, a processor will receive instructions and data from read-only memory, random access memory, or both of them.

The core elements of a computer are one or more memory devices for storing instructions and data and a processor for executing the instructions. In addition, computers will be typically operably coupled to or include one or more mass storage devices for storing data, such as magnetic, magneto-optical or optical disks, to receive data from and transmit data to the storage devices or perform both of the operations. However, the computer does not need to necessarily have such a device.

This description described above presents the best mode of the present invention and provides examples to illustrate the present invention and allow those skilled in the art to construct or use the present invention. The specification written in this way does not limit the present invention to the specific terms presented.

Therefore, although the present t invention has been described in detail with reference to the examples described above, those skilled in the art may make modifications, changes, and variations to the examples without departing from the scope of the present invention. In short, it is noted that it does not necessarily need to separately include all the functional blocks shown in the drawings or follow all the sequences illustrated in the drawings to achieve the effects intended by the present invention, and it may fall within the technical scope of the present invention described in the claims although it is not that.

The method and system for balancing energy demand-supply at a community level based on self-demand response according to an embodiment by the technical spirit of the present invention may obtain balance of energy demand-supply at a community level, and achieve and manage the balance of energy demand-supply within the community itself, by creating a balancing group for obtaining the balance of energy demand-supply in units of time zones and using the reserve margin of the balancing group.

The method and system for balancing energy demand-supply at a community level based on self-demand response according to an embodiment by the technical spirit of the present invention may provide a Procurement Capability of Reserve Margin (PCRM) for securing the reserve margin of a community itself through optimization of energy resources (including Demand Response (DR) resources and Distributed Energy Resources (DER), which are loads that use power) at a community level.

The method and system for balancing energy demand-supply at a community level based on self-demand response according to an embodiment by the technical spirit of the present invention may provide a technique of grouping the reserve margin that may operate in units of time zones into balancing groups, and calculating reliability and expected performance of the balancing groups.

The method and system for balancing energy demand-supply at a community level based on self-demand response according to an embodiment by the technical spirit of the present invention may provide a technique of operating self-demand response (Self-DR) on the basis of reserve margin secured through PCRM.

The method and system for balancing energy demand-supply at a community level based on self-demand response according to an embodiment by the technical spirit of the present invention may autonomously manage the energy self-sufficiency and the energy efficiency level of a community at the community level.

The method and system for balancing energy demand-supply at a community level based on self-demand response according to an embodiment by the technical spirit of the present invention may collect energy data at the community level, calculate CBL/RRMSE for each energy data to evaluate consumption of energy and patterns and reliability of power generation, calculate PCRM for each window to create a balancing group, and operate the balancing group according to various demand response schemes (DR Schemes).

The method and system for balancing energy demand-supply at a community level based on self-demand response according to an embodiment by the technical spirit of the present invention may also optimize the load (amount of power used) of individual resources or collective groups belonging to the community using the balancing group, and the load optimization within the community may be independently managed for the management purposes of the community itself (operation of self-demand response).

The method and system for balancing energy demand-supply at a community level based on self-demand response according to an embodiment by the technical spirit of the present invention may maximize community energy efficiency and allow a community to be the subject of energy management in each community and thus may contribute to decarbonization policies.

The effects that can be achieved by the method and system for balancing energy demand-supply at a community level based on self-demand response according to an embodiment of the present invention are not limited to the effects mentioned above, and unmentioned other effects will be clearly understood by those skilled in the art from the above description.

DESCRIPTION OF SYMBOLS

11: DSO/TSO Territory
12: Grouping
71: Self-DR Event Dispatch
72: Procuring Reserve Margins (KW) from DR Resources, ESS, EV and PV
73: Energy Saving
74: Market Participation
75: Market Participation with Balancing Groups
90: Balancing Market
100: Energy demand-supply balancing system
101: Self-DR Program
110: Community configuration module
120: Windows definition module
130: Balancing module
140: Pattern analysis module

What is claimed is:

1. A method of balancing energy demand-supply, the method comprising the steps of:

(a) dividing a predetermined region into a plurality of communities, by a community configuration module;

(b) defining a plurality of windows, each window being a time period set to a predetermined time period, wherein twenty-four hours of a day are divided into the plurality of windows, by a window definition module;

(c) creating a balancing group including demand response resources and distributed energy resources included in one community for each window of the plurality of windows, by a balancing module; and (d) reducing or eliminating a demand-supply difference of power in the community using the balancing group created in each window of the plurality of windows of the community, by the balancing module.

2. The method according to claim 1, wherein step (c) includes the steps of:

analyzing individual resource patterns including power consumption patterns of the demand response resources included in the community and power production patterns of the distributed energy resources included in the community; and creating the balancing group by selecting demand response resources and distributed energy resources that can reduce or eliminate the demand-supply difference of power in the community within the window on the basis of the individual resource patterns.

3. The method according to claim 2, wherein step (d) includes the step of reducing or eliminating the demand-supply difference of power in the community by using a reserve margin calculated considering power used by the demand response resources and power produced or charged and discharged by the distributed energy resources.

4. The method according to claim 3, wherein when demand of power for the community exceeds supply of power within the window, the balancing module creates the balancing group by selecting the demand response resources and the distributed energy resources in the community to generate a reserve margin corresponding to the exceeded demand of power.

5. The method according to claim 3, wherein when supply of power for the community exceeds demand of power within the window, the balancing module creates the balancing group by selecting the demand response resources and the distributed energy resources in the community to charge the exceeded supply of power.

6. The method according to claim 3, wherein the balancing module supplies the reserve margin of the balancing group, which remains after being used for the community within the window, to the outside of the community.

7. The method according to claim 2, wherein step (d) includes the step of providing the balancing module with past data on the demand-supply difference of power in the community in units of windows by using individual resource patterns of the past, by a pattern analysis module, wherein the balancing module creates the balancing group by selecting demand response resources and distributed energy resources that can reduce or eliminate the demand-supply difference of power in the past derived from a window of the same time in the past.

8. The method according to claim 2, wherein at step (d), the balancing module calculates a first demand-supply difference of power in the community generated in a first window, and the balancing module creates the balancing group by selecting demand response resources and distributed energy resources that can reduce or eliminate the first demand-supply difference of power in the community in a second window successively located after the first window.

* * * * *